United States Patent Office 3,498,952
Patented Mar. 3, 1970

3,498,952
POLYESTER RESINS FROM 2-METHYL-2-PHENYL-1,3-PROPANEDIOL
Maria V. Wiener, Akron, Ohio, assignor to The Goodyear Tire & Rubber Company, Akron, Ohio, a corporation of Ohio
No Drawing. Continuation-in-part of application Ser. No. 397,653, Sept. 18, 1964. This application Oct. 3, 1968, Ser. No. 764,948
Int. Cl. C08g 17/04
U.S. Cl. 260—75                                6 Claims

ABSTRACT OF THE DISCLOSURE

Polyesters of terephthalic acid and isophthalic acid with 2-methyl-2-phenyl-1,3-propanediol and a glycol of the formula $HOCH_2(CX_2)_nCH_2OH$ which contain up to 70 mol percent of the aliphatic glycol. The polyesters have high softening points and good thermal stability and are particularly useful in laminate and coating applications.

---

This application is a continuation-in-part of my application Ser. No. 397,653, filed Sept. 18, 1964, now Patent No. 3,423,280.

This invention relates to new and useful polymeric polyesters and to shaped articles prepared therefrom.

The prior art describes homopolyesters derived from ethylene glycol and other polymethylene glycols and terephthalic acid and copolyesters such as copolyesters derived from mixtures of terephthalic acid and isophthalic acid. The softening point of polyethylene terephthalate represents a maximum softening point for such polyesters. While the softening point of these resins makes them satisfactory for many purposes there are some applications in which higher softening points are needed.

According to the present invention polyesters of improved softening points are obtained by reacting one or more dicarboxylic acids or their ester-forming derivatives and a glycol composition selected from (a) 2-methyl-2-phenyl-1,3-propanediol and (b) mixtures of 2-methyl-2-phenyl-1,3-propanediol with a polymethylene glycol having the formula $HOCH_2(CX_2)_nCH_2OH$ in which $n$ is from zero to ten and X is selected from hydrogen and alkyl groups containing from one to four carbon atoms, 2-methyl-2-phenyl-1,3-propanediol comprising at least 3 mol percent of said mixture. Such polyesters have higher softening points than polyesters composed of the same acid units and polymethylene glycol units without the 2-methyl-2-phenyl-1,3-propanediol units.

A preferred method for preparing these copolyesters is to subject one or more ester-forming derivatives of at least one acid selected from the group consisting of terephthalic acid and isophthalic acid to reaction with an excess of a glycol component selected from (a) 2-methyl-2-phenyl-1,3-propanediol and (b) mixtures of 2-methyl-2-phenyl-1,3-propanediol and a polymethylene glycol having the formula $HOCH_2(CX_2)_nCH_2OH$ in which $n$ is from 0 to 10 and X is hydrogen or an alkyl group containing from one to four carbon atoms to form the glycol esters and then polymerize the glycol esters by condensation to form high molecular weight polyester resin.

Representative examples of such polymethylene glycols are ethylene glycol, the propylene glycols, the butylene glycols, pentamethylene glycol, hexamethylene glycol, heptamethylene glycol, octamethylene glycol, nonamethylene glycol, decamethylene glycol and branched chain glycols such as 2-methyl-1,3-propylene glycol, 2,2-dimethyl-1,3-propylene glycol, 2-ethyl-2-methyl-1,3-propylene glycol, 2-butyl-1,3-propylene glycol, 2,2-butyl-1,3-propylene glycol and other branched chain glycols.

Fibers made from copolyesters of the invention have better dye receptivity than fibers made from polymeric ethylene terephthalate or fibers made from polymeric ethylene terephthalate-ethylene isophthalate copolyesters. Also, the crystallization rate and the degree of crystallization obtainable in the polymeric ethylene terephthalate/2-methyl-2-phenyl-1,3-propylene terephthalate copolyesters in which the molar ratio of ethylene terephthalate units to 2-methyl-2-phenyl-1,3-propylene terephthalate units is in the range of from 97/3 to 70/30 are less than the crystallization rate and the degree of crystallization obtainable under comparable conditions in copolyesters of ethylene terephthalate/ethylene isophthalate in which the terephthalate to isophthalate ratio is in the same range of 97/3 to 70/30.

The polyesters of the invention form highly useful fibers, high softening films, coatings and molded products. They are also useful as adhesives for adhering various materials together.

The invention provides a series of polyester resins of varying properties. The products containing up to 70 mol percent of polymethylene glycol units and from 30 to 100 mol percent of 2-methyl-2-phenyl-1,3-propanediol units are substantially noncrystalline products which form valuable coatings, films and adhesives that have high softening points.

Thus, in applications for the resins in which substantially uncrystallizable copolyesters are desired, the copolyesters containing less than 70 mol percent of the polymethylene glycol units and more than 30 mol percent of 2-methyl-2-phenyl-1,3-propanediol units are suitable. These materials have high softening points, as is illustrated by the homopolyester 2-methyl-2-phenyl-1,3-propanediol prepared in Example 1 below. This polyester has a softening point of 100.5° C. and a density of 1.24 grams per cubic centimeter. Polyesters containing lesser amounts of the 2-methyl-2-phenyl-1,3-propanediol have somewhat lower softening points but their softening points remain in the region which may be considered to be relatively high as compared with other known copolyesters of terephthalic acid and isophthalic acid with polymethylene glycol. Particularly useful polyesters are the terephthalate polyesters which contain up to 10 percent of the polymethylene glycol, and correspondingly from 90 to 100 percent of the 2-methyl-2-phenyl-1,3-propanediol.

The terephthalate/isophthalate copolyesters of 2-methyl-2-phenyl-1,3-propanediol are also useful materials which have good adhesive properties and may be used in the preparation of laminates and coated articles. Especially useful copolyesters of this family are the copolyesters containing at least 90 percent of terephthalic acid and correspondingly 10 percent or less of the isophthalic acid.

The terephthalate copolyesters containing unsubstituted polymethylene glycols and less than 30 mol percent of 2 - methyl - 2-phenyl-1,3-propanediol units are generally crystallizable products which form valuable oriented fibers and films and can also be used as adhesives and coatings. The preferred crystallizable materials of the invention contain from 97 to 85 mol percent of ethylene terephthalate and from 3 to 15 mol percent of 2-methyl-2-phenyl-1,3-propanediol terephthalate. These resins are particularly useful for the preparation of high strength fibers and films having good dye receptivity.

The following examples illustrate the invention.

Example 1

9.7 grams dimethyl terephthalate, 19.4 grams 2-methyl-2-phenyl-1,3-propanediol, 0.003 gram zinc diacetate and 0.003 gram antimony trioxide were placed into a glass polymerization vessel in the shape of a tube 35 centimeters long, having an inside diameter of 38 millimeters and equipped with a stirrer and having a side arm connected to a distillation apparatus. The lower part of the reactor was heated by a vapor bath having a temperature of 265° C. and a slow stream of nitrogen gas was passed over the molten reactants to exclude air. Methanol was distilled from the mixture until the alcoholysis reaction was essentially complete. Then the whole reactor was heated by the vapor bath having a temperature of 265° C. and the pressure in the reactor was slowly reduced over a period of 45 minutes to 0.05 millimeter of mercury pressure while excess diol was distilled out. The polycondensation was subsequently carried out for two hours at 280° C. bath temperature and 0.05 millimeter of mercury pressure. A transparent polymer having an intrinsic viscosity of 0.4, a softening point of 100.5° C. and a density of 1.24 grams per cubic centimeter was obtained.

Example 2

19.4 grams dimethyl terephthalate, 13 grams ethylene glycol, 0.006 gram zinc diacetate and 0.001 gram polymeric ethylene glycol titanate were charged into a glass polymerization reactor of the type used in Example 1. The mixture was heated at a bath temperature of from 217° C. to 240° C. and a slow nitrogen stream was passed over the reactants to exclude air. Methanol removal was completed in 80 minutes. Then 5.0 grams 2-methyl-2-phenyl-1,3-propanediol were added to the reactor. Heating was then resumed at 240° C. bath temperature while the pressure in the reactor was slowly reduced over a period of 45 minutes to one millimeter of mercury pressure. The excess ethylene glycol distilled out. The polycondensation was carried out for one hour at 280° C. bath temperature at one millimeter of mercury pressure. A transparent, tough high polymer, having an intrinsic viscosity of 0.657, a softening point of 85° C. and a density of 1.291 grams per cubic centimeter was formed.

Example 3

A glass reaction vessel of the type used in Example 1 was charged with 19.4 grams of dimethyl terephthalate, 1.7 grams of 2-methyl-2-phenyl-1,3-propanediol, 12.4 grams of ethylene glycol, 0.006 gram of zinc acetate and 0.006 gram of antimony trioxide. The mixture was stirred and reacted at a bath temperature of from 217° C. to 245° C. until the ester exchange was complete, as indicated by the collection of the theoretical amount of methanol. Then the mixture was stirred and heated at a bath temperature of 240° C. while the pressure in the reactor was slowly reduced over a period of 45 minutes to one millimeter of mercury pressure as part of the ethylene glycol distilled out of the mixture. The polycondensation reaction was carried out by heating for one and one-half hours at 280° C. at one millimeter of mercury pressure. The product was a crystallizable high polymer having an intrinsic viscosity of 0.612 and a melting point of 233° C. The quenched polymer was transparent, had a softening point of 77° C. and a density of 1.316 grams per cubic centimeter.

Example 4

0.05 gram Latryl Blue RLN was mixed with 50 grams of distilled water in a small glass vessel. 0.2 gram of fibers drawn from a 90/10 poly(ethylene terephthalate/ethylene isophthalate) copolyester and 0.2 gram of fibers drawn from a 90/10 poly(ethylene terephthalate/2-methyl-2-phenyl-1,3-propylene terephthalate) copolyester were placed in the dye bath. The vessel containing the dye bath and the fibers was heated with stirring for two hours in a boiling water bath. Then the fibers were removed from the bath, washed with water and dried. The colors of the fibers were compared. The color of the poly(ethylene terephthalate/ethylene isophthalate) fibers was a light sky-blue, whereas the color of poly(ethylene terephthalate/2-methyl-2-phenyl-1,3 propylene terephthalate) fibers was a dark blue similar to navy-blue.

Films can be made from the polyesters of the invention by solution casting or by melt extrusion. Orientation or stretching is necessary to develop optimum properties for use in packaging applications and for other uses where films and foils having high tensile strength are needed. The films are clear and are characterized by high tensile strength, low elongation, good age life and excellent dielectric strength. For the films to have good physical properties the polyesters should have a high molecular weight, i.e., an intrinsic viscosity of at least 0.4 and preferably above 0.6 measured at 30.0° C. in a 60/40 phenol-tetrachloroethane mixed solvent.

The resins of the invention form useful coatings and laminates with various substrates such as wood, paper, plastics, leather, glass, iron, steel, copper and aluminum and form effective insulating layers. If desired, the resins can be compounded with pigments, fillers, stabilizers, plasticizers and other compounding agents.

While certain representative embodiments and details have been shown for the purpose of illustrating the invention it will be apparent to those skilled in this art that various changes and modifications may be made without departing from the spirit or scope of the invention.

What I claim is:

1. As a new composition a linear polyester resin consisting of units of at least one acid selected from the group consisting of terephthalic acid and isophthalic acid and a mixture of glycol units in which less than 70 mol percent of the glycol units in the polyester resin are units of a glycol selected from the group represented by the formula $HOCH_2—(CX_2)_n—CH_2OH$ wherein $n$ is zero to ten inclusive and X is selected from the group consisting of hydrogen and alkyl radicals containing from one to four carbon atoms, based on the total mols of acid units in the resin, the balance of the glycol units being 2-methyl-2-phenyl-1,3-propanediol units.

2. The composition of claim 1 in which the glycol of the general formula is ethylene glycol.

3. The composition of claim 1 in which the acid units are terephthalic acid units and the glycol composition is ethylene glycol and 2-methyl-2-phenyl-1,3-propanediol.

4. The polyester of claim 1 in the form of an oriented fiber.

5. The polyester of claim 1 in the form of a film.

6. As a new composition of matter polymeric 2-methyl-2-phenyl-1,3-propanediol terephthalate having an intrinsic viscosity of at least 0.4 measured in a 60/40 phenoltetrachloroethane mixed solvent at 30° C.

No references cited.

WILLIAM H. SHORT, Primary Examiner

M. GOLDSTEIN, Assistant Examiner

U.S. Cl. X.R.

117—132, 142, 148, 155, 161; 161—194, 214, 226, 231